United States Patent
Sherlock (10) Patent No.: US 10,253,819 B2
(45) Date of Patent: Apr. 9, 2019

(54) CONNECTION ARRANGEMENT FOR AXIALLY SECURING A SHAFT-HUB CONNECTION, AND METHOD FOR AXIALLY SECURING A SHAFT-HUB CONNECTION

(71) Applicant: IFA-Technologies GmbH, Haldensleben (DE)

(72) Inventor: John Sherlock, Wolverhampton (GB)

(73) Assignee: IFA-Technologies GmbH, Haldensleben (DE)

( * ) Notice: Subject to any disclaimer, the term of this patent is extended or adjusted under 35 U.S.C. 154(b) by 57 days.

(21) Appl. No.: 15/319,462

(22) PCT Filed: Jun. 18, 2015

(86) PCT No.: PCT/DE2015/000299
§ 371 (c)(1),
(2) Date: Dec. 16, 2016

(87) PCT Pub. No.: WO2015/192826
PCT Pub. Date: Dec. 23, 2015

(65) Prior Publication Data
US 2017/0321755 A1    Nov. 9, 2017

(30) Foreign Application Priority Data
Jun. 18, 2014  (DE) .................. 10 2014 008 719

(51) Int. Cl.
F16D 1/08 (2006.01)
F16D 1/116 (2006.01)
F16B 21/18 (2006.01)
F16D 1/10 (2006.01)
F16D 3/223 (2011.01)
(Continued)

(52) U.S. Cl.
CPC ............ F16D 1/0829 (2013.01); F16B 21/18 (2013.01); F16D 1/116 (2013.01); *F16B 17/004* (2013.01);
(Continued)

(58) Field of Classification Search
CPC ........ F16B 21/16; F16B 21/186; F16B 21/18; F16D 1/0829; F16D 1/116;
(Continued)

(56) References Cited

U.S. PATENT DOCUMENTS 5,807,180 A    9/1998  Knodle et al.
6,780,114 B2*  8/2004  Sahashi ............... B60B 27/00
                                                          464/146
(Continued)

FOREIGN PATENT DOCUMENTS

DE    19809197 A1 * 10/1998 ............. B62D 1/192
DE    100 20 975 C2    11/2001
(Continued)

OTHER PUBLICATIONS

Translation of DE 10 2009 020 981. IFA Technologies. Connecting arrangement for transmission shaft, has joint for insertion in drive shafts of motor vehicles, where connecting element re-clamping join patch is formed between transmission shaft and interior hub of joint. Nov. 18, 2010.*
(Continued)

*Primary Examiner* — Josh Skroupa
(74) *Attorney, Agent, or Firm* — Collard & Roe, P.C.

(57) ABSTRACT

A connection arrangement for axially securing a shaft-hub connection includes a shaft, a hub, and a securing device. The hub has an inner stop surface for the shaft formed by a recess and has an outer groove for axially positioning the securing device. The securing device has an axially extending sleeve-shaped part at least partly surrounding the circumference of the hub and has a radial collar at least partly engaging behind the annular end surface of the hub. The sleeve-shaped part is surrounded by a tensioning strap. A holding socket region offset radially inwards surrounds the expanded outer groove of the hub coaxially in the assembled (Continued)

state and can be locked in the expanded outer groove of the hub by the tensioning strap. The radial collar of the holding socket rests against an axial securing ring of the shaft in the locked state.

14 Claims, 4 Drawing Sheets

(51) Int. Cl.
*F16B 17/00* (2006.01)

(52) U.S. Cl.
CPC .................. *F16D 2001/103* (2013.01); *F16D 2003/22323* (2013.01); *Y10T 403/7033* (2015.01)

(58) Field of Classification Search
CPC ..... F16D 2001/103; F16D 2003/22323; Y10T 403/58; Y10T 403/7033; Y10T 403/7075
USPC ......... 403/315, 359.5, 376, DIG. 7; 464/182
See application file for complete search history.

(56) References Cited

U.S. PATENT DOCUMENTS

| | | |
|---|---|---|
| 8,012,030 B2 | 9/2011 | Cermak et al. |
| 8,025,454 B2 | 9/2011 | Cermak |
| 8,070,613 B2 * | 12/2011 | Cermak ................ F16D 3/2237 464/182 |
| 8,277,330 B2 | 10/2012 | Szentmihalyi |
| 8,322,941 B2 * | 12/2012 | Cermak ................ F16B 21/186 403/359.5 |
| 8,425,142 B2 * | 4/2013 | Disser .................... F16D 1/116 403/359.5 |
| 8,870,489 B2 | 10/2014 | Langer et al. |

FOREIGN PATENT DOCUMENTS

| | | | |
|---|---|---|---|
| DE | 10 2008 009 362 B4 | 8/2009 | |
| DE | 10 2008 009 363 B4 | 12/2009 | |
| DE | 10 2009 020981 A1 | 11/2010 | |
| DE | 10 2007 026 040 B4 | 6/2011 | |
| EP | 1 199 488 A2 | 4/2002 | |
| JP | H0514624 B2 * | 2/1993 | ............. B41J 23/04 |
| WO | 2010/111990 A1 | 10/2010 | |

OTHER PUBLICATIONS

Translation of DE 100 20 975. Beigang, et al. Axial Fixing Device. Mar. 7, 2002.*

International Search Report of PCT/DE2015/000299, dated Sep. 28, 2015.

* cited by examiner

CONNECTION ARRANGEMENT FOR AXIALLY SECURING A SHAFT-HUB CONNECTION, AND METHOD FOR AXIALLY SECURING A SHAFT-HUB CONNECTION

CROSS REFERENCE TO RELATED APPLICATIONS

This application is the National Stage of PCT/DE2015/000299 filed on Jun. 18, 2015, which claims priority under 35 U.S.C. § 119 of German Application No. 10 2014 008 719.0 filed on Jun. 18, 2014, the disclosure of which is incorporated by reference. The international application under PCT article 21(2) was not published in English.

STATE OF THE ART

The invention proceeds from a connection arrangement for axially securing a hub/shaft connection, and a method for axially securing a hub/shaft connection.

In the case of connection arrangements of shafts and hub, which do not act solely by means of force fit, axial securing devices that act by means of shape fit are fundamentally provided, which devices determine the position of shaft and hub relative to one another, in that they engage into the two parts with shape fit and prevent loosening of the connection when axial forces that act on the shaft and/or hub occur. For this purpose, a plurality of systems are known, which guarantee different degrees of safety; their technical implementation requires different degrees of effort for the respective application, both in terms of production and in terms of handling by the user, in other words assembly and disassembly of the shaft/hub connection, and they contribute in different ways to weight reduction of the connection arrangement. An alternative to the connection arrangements in which an axial securing ring as well as a solid connection cuff that can be set onto or screwed onto the hub are used, which arrangements are very reliable but relatively complicated in terms of production, assembly, and disassembly, and rather heavy in terms of weight, such as in DE 10 2007 026 040 B4, consists in the use of light-weight holding sockets having an engagement function, in which at least one end of the holding socket, configured to be radially elastic, engages into at least one of the parts of the connection arrangement.

In this regard, a connection arrangement of a transmission shaft with a joint for use in drive shafts of motor vehicles is known, in which arrangement a connection element configured in pot-like manner encloses the joining location between the transmission shaft and the inner hub of the joint. The connection element consists of two accommodation parts, with which the transmission shaft and the inner hub can be joined. The outer and inner edge regions of the accommodation parts are configured with raster tabs that are directed radially inward, are circumferential, and, in the joined state of the transmission shaft with the inner hub, engage into grooves of the transmission shaft and of the inner hub. However, such an elastic connection element can only be used in those connection arrangements in which the torque transfer is guaranteed by means of a pressing tooth system. In this regard, a specific axial force is applied when shaft and hub are joined together, and the connection element is merely used as an additional securing device.

Furthermore, a connection arrangement between a shaft journal and a constant velocity rotary joint having an inner joint part and an outer joint part is known, wherein the shaft journal engages into one of the joint parts in torque-proof manner. A bracing sleeve is provided for connecting and axially securing the two parts, which sleeve is axially secured on one of the components, here the inner joint part, by means of shape fit. It has at least one elastic element, which can be engaged into a contour of the other component, here the shaft journal, wherein the elastic element exerts an axial force on this component, in the direction of the first component. For this purpose, the bracing sleeve has elastically deformable radially angled parts that project beyond the face surface of the inner joint part and lie against this surface. The connection arrangement makes do without an additional axial securing ring (WO 2010/111990 A1).

The disadvantage of this connection arrangement consists in that it does not have any kind of securing device to prevent the bracing sleeve from springing open elastically, so that when axial forces that overcome its inherent elastic tension occur, there is always the risk that the connection will come loose. It is true that the bracing sleeve can also be designed, in terms of its elasticity, so that springing open is reliably prevented when operationally normal axial forces are in effect. However, then its assembly and disassembly will once again prove to be difficult, because its radially angled parts must widen when it is pushed onto the inner joint part and when the shaft journal is pushed into the inner joint part, which requires a relatively great expenditure of force. In any case, the bracing sleeve must apply defined forces for axial securing, which forces must be guaranteed by the material used and/or its shape.

Likewise, an arrangement for axially securing a hollow shaft and a guide pin makes do with only one sleeve-shaped elastic securing element, wherein the guide pin supports itself on an inner stop in the hollow shaft. The elastic securing element axially engages, with a first axial end configured to be radially elastic, into a groove on the guide pin, with shape fit, or engages behind a step of the guide pin. With the second axial end, the securing element engages into a groove of the hollow shaft, with shape fit. From the outside, the securing element is surrounded by a tensioning strap, and thereby prevented from springing open radially when axial forces act on it (DE 100 20 975 C2).

The disadvantage of this arrangement for axial securing consists in the complicated nature of the sleeve-shaped elastic securing element, which requires a complicated shape for its production and is therefore relatively expensive.

A connection arrangement between a shaft journal and a constant velocity rotary joint is also known, which arrangement finds use particularly in a longitudinal drive of a motor vehicle. The constant velocity rotary joint has an inner joint part that is connected, in torque-proof manner, with the shaft journal for transfer of a torque, and a sleeve extension having an engagement recess in its outer circumference surface. At the axial level of the sleeve extension, the shaft journal is provided with a journal groove. For axial fixation of the inner joint part relative to the shaft journal, a securing sleeve is provided, which sleeve has inner holding sections and outer holding sections. In the assembled state, the sleeve extension is pushed into the annular space formed between the inner and outer holding sections, wherein the inner holding sections engage into the journal groove and the outer holding sections engage into the engagement recess. To prevent radial widening of the securing sleeve, a cuff is drawn onto it (DE 102008 009 362 B4).

The disadvantage of this connection arrangement consists in that the use of the invention is restricted to those constant velocity rotary joints whose inner joint part is provided with a longer sleeve extension. The production of such inner joint parts requires additional effort in terms of material and production. Also, the production of the securing sleeve itself is complex because of its complicated shape. Furthermore, its assembly requires a specific axial force that must be applied by the joint, as a counter-force, and this in turn is harmful for the joint. In particular, its inner ring must be supported. Disassembly on the vehicle is not easily possible.

Finally, another type of connection arrangement between a shaft journal and a constant velocity rotary joint is known, which also is used in the longitudinal drive of a motor vehicle. In this invention, too, the constant velocity rotary joint has an inner joint part that is connected, in torque-proof manner, with the shaft journal, to transfer a torque, and a sleeve-shaped section having an inner annular groove. In addition, an axial securing ring that can be widened radially and elastically, for axial fixation of the inner joint part, is provided, which engages into a journal groove of the shaft journal. In order to prevent radial widening of the axial securing ring when axial forces that act on the connection arrangement occur, securing means are disposed on the sleeve-shaped section of the inner joint part, in such a manner that they lie against the axial securing ring with their inner mantle surface, at least in part. For this purpose, the sleeve-shaped section is provided with a recess, at least in part, into which recess parts of the axial securing ring project. The axial securing ring can have both a closed shape and an open shape (DE 10 2008 009 363 B4).

The disadvantage of this connection arrangement consists, here too, in the production effort in the production of the inner joint part having the sleeve-shaped section, into which section, furthermore, a recess for accommodating the open ends of the axial securing ring also has to be introduced. Disassembly also proves to be complicated, because for this purpose, after the securing means is removed, the axial securing ring still has to be widened using a special tool, or the shaft journal has to be pulled out of the inner joint ring, by means of the effect of axial forces, or the joint has to be pulled off the shaft journal. The relatively long chamfer that must be applied on the face side of the shaft, for spreading the axial securing ring open when the shaft is pushed into the inner joint part, is also disadvantageous. As a result, the length of the splined cog that transfers the torque is shortened, and the transfer of power by the joint is reduced. Otherwise, the region of the inner joint part that transfers the torque must be configured to be longer, for greater power transfer, and this in turn increases the weight of the connection arrangement.

THE INVENTION AND ITS ADVANTAGES

The connection arrangement according to the invention, for axially securing a shaft/hub connection, having the features described herein, has the significant advantage, as compared with the state of the art indicated above, that it can easily be assembled and disassembled, because the securing means can be easily pushed onto the hub or the inner ring of a joint, by hand, without any special tool, because it sits loosely on the hub or shaft in the pre-assembled state. An extra groove for the securing means in the shaft is not required.

The securing means, consisting of holding socket and tensioning band, has a lower weight and a simple structure, in terms of design, and can therefore be produced in simple manner. For axially securing the holding socket on the hub or the inner ring of the joint, the hub requires a short axial extension for a somewhat widened groove, as compared with the state of the art, in which groove the region of the holding socket with the tensioning band, which region extends axially, is accommodated. An additional advantage of axial securing by means of the holding socket according to the invention consists in that the hub is merely given one recess in the form of a countersunk region, to accommodate the axial securing ring of the shaft, on the face side, against which recess the axial securing ring lies on the face side. In this way, neither a groove for the axial securing ring nor a stop for the shaft needs to be provided within the hub, and therefore production of the hub is significantly simplified.

Disassembly of the connection arrangement is also easily possible by hand or using a suitable tool, if necessary. After the tensioning band is loosened, a holding socket that consists of an elastic material goes back into its starting position, and thereby its collar releases the axial securing ring, so that the shaft can be pulled out of the hub. A holding socket permanently deformed by the tensioning band is radially widened, using a screwdriver or a similar tool, for example, until the axial securing ring is exposed. This ring might already widen when shaft and hub are pulled apart from one another.

These advantages are achieved in that the securing means consists of a holding socket that can be radially deformed by means of a tensioning band and has a radial collar that is directed radially inward and radially surrounds not only the free face surface of the hub, but, in the assembled state, also the axial securing ring of the shaft, at least in part. Following the radial collar, the holding socket is configured in sleeve shape, as is also known from the state of the art. However, this sleeve-shaped region is set off radially inward from its outside diameter, and can be pressed into the widened outer groove of the hub, which was already mentioned above, by means of the tensioning band, for example at a known Oetiker clamp.

The axial position between shaft and hub is achieved by means of the known, simple axial securing ring that is positioned in the groove of the shaft. This axial securing ring, in the assembled state, lies against the inner stop surface situated axially just behind the face surface of the hub, wherein the axial securing ring ends with this face surface or actually projects slightly beyond it. When the tensioning band is tightened, the radial collar of the holding socket, which previously merely surrounded the free face surface of the hub, also continues to constrict radially, so that it comes to lie against the axial securing ring of the shaft when the shaft is positioned in the hub.

According to an advantageous embodiment of the invention, the holding socket is divided on its circumference, in the axial direction. In this way, it can be compressed more easily by the tensioning band during assembly.

According to an advantageous embodiment of the invention, in this regard, the ends of the holding socket that stand opposite one another at the division are spaced apart from one another, so that there is a gap between them. In this way, it is guaranteed that when the tensioning band is tightened, the sleeve-shaped part of the holding socket lies completely against the groove base, so that a secure seat of the holding socket on the hub is achieved.

According to an additional advantageous embodiment of the invention, the radial collar, which surrounds the face surface of the hub, has an additional division at least on its circumference region that lies opposite the division of the holding socket. In this way, the holding socket can be closed more easily when the tensioning band is tightened. At the same time, the two ends of the radial collar that are spaced apart move toward one another, so that its inside diameter is reduced, and thereby the radial collar comes to lie against the axial securing ring without any greater expenditure of force when the tensioning band is tightened, and presses this ring against the inner stop surface situated in the hub.

The inside diameter of the sleeve-shaped part of the holding socket surrounded by the tensioning band can vary between the size of the outside diameter of the hub and of the outside diameter of its widened outer groove. If the inside diameter of the radially offset region approximately corresponds to the outside diameter of the hub, then the holding socket can be easily pushed onto the hub, quasi without widening. In the other case, in other words if the inside diameter of the sleeve-shaped part of the holding socket corresponds to the outside diameter of the hub in the region of its widened outer groove, the holding socket can still be easily pushed onto the hub or the inner ring of the joint, if it is structured to be divided or the sleeve-shaped region is structured to be segmented. A particularly advantageous embodiment is present in the case if the inside diameter of the sleeve-shaped part of the holding socket is slightly smaller than the outside diameter of the hub. This is because then the sleeve-shaped region that is offset radially inward engages into the widened outer groove of the hub, so that the holding socket, in the pre-assembled state, can be captively retained on the hub or the inner joint ring.

According to another advantageous embodiment of the invention, the radial collar consists of a plurality of elastic elements, i.e. the radial collar is formed by tongue-like sections that are directed radially inward. In this way, it is guaranteed that the pressure that proceeds from the holding socket is exerted at multiple locations, distributed over the circumference, and thereby is exerted more uniformly on the axial securing ring. In the case of a closed radial ring, there is the risk that if the holding socket is tilted, its radial collar would lie against the axial securing ring only at certain points.

According to an additional advantageous embodiment of the invention, the sleeve-shaped circumferential region of the holding socket that is offset radially inward consists of individual segments. Aside from the weight saving, the holding socket can thereby be assembled with or disassembled from the hub even more easily, particularly if the inside diameter of the offset sleeve-shaped circumferential region is less than the outside diameter of the hub.

According to another advantageous embodiment of the invention, the circumference region of the holding socket that is radially offset inward is configured as a U-profile in cross-section, which profile accommodates the tensioning band, thereby giving the band its secure axial positioning. Furthermore, it can be captively pre-assembled on the holding socket.

According to a particularly advantageous embodiment of the invention, the holding socket consists of an elastic material. As a result, a reset force occurs at every elastic deformation of the holding socket, which force particularly guarantees a permanent reaction force on the axial securing ring of the shaft, particularly when the radial collar is displaced, and thereby guarantees axial freedom of play of the shaft/hub connection.

The methods according to the invention have the significant advantage that shaft and hub can be easily assembled and disassembled, because the holding socket according to the invention does not have to be widened at all or only has to be widened slightly both when it is connected with the hub and during disassembly, in other words when the shaft is pulled out of the hub. Furthermore, the holding socket, which is secured by the tensioning band, guarantees complete freedom of play between shaft and hub and the axial securing ring, thereby guaranteeing low-noise running of the shaft/hub connection.

In a first method variant, the holding socket is pushed onto the hub for assembly of the shaft/hub connection, until it lies against the face surface of the hub with its radial collar. In this regard, the region of its sleeve-shaped part that is offset radially inward in the form of a wide corrugation comes to lie above the widened outer groove of the hub. In this way, the hub is completed, for now. Afterward, the shaft, with the axial securing ring set into it, is pushed into the hub, or, vice versa, the hub is pushed onto the shaft, until the axial securing ring makes contact with the stop surface in the interior of the hub. This corresponds to a pre-assembled state of the shaft/hub connection.

The final state of assembly and thereby final axial securing between shaft and hub is achieved by means of laying and/or tightening a tensioning band around the radially offset region of the holding socket, wherein this socket lies against the base of the widened outer groove on the hub with this region. In the case of an axially divided holding socket, during this process the radial collar of the holding socket simultaneously moves toward the axial securing ring in the radial direction, so that the radial collar projects concentrically beyond the face surface of the hub into the region of its face-side recess, and, in this connection, comes to lie against the axial securing ring of the shaft. In the event that the axial securing ring projects beyond the face surface of the hub, the radial collar of the holding socket is slightly pressed away axially from the face surface by the axial securing ring during this process, and, as a counter-reaction, permanently exerts an axial force on the axial securing ring, thereby axially securing the shaft relative to the hub, without play. Preferably, holding sockets whose radial collar narrows to such an extent, when the tensioning band is tightened, that the collet can engage behind the axial securing ring are used for this assembly variant. In general, only holding sockets having a divided structure demonstrate such deformation behavior.

In the case of closed holding sockets, their radial collar does not deform or deforms only slightly when the tensioning band is tightened in the radial direction. For this reason, the inside diameter of its radial collar is structured in such a manner that it can be easily pushed onto the shaft and already engages behind the axial securing ring in the initial state, in other words without the tensioning effect of the tensioning band. Such holding sockets are pushed onto the shaft for assembly in accordance with another method variant of the invention. If only one end of the shaft is accessible for this purpose, the holding socket must be pushed onto the shaft even before the axial securing ring is placed into the groove of the shaft, so that the radial collar engages behind the axial securing ring mounted on the shaft. The module pre-assembled in this manner is now pushed into the hub, or, vice versa, the hub is pushed onto the shaft completed with the axial securing ring and holding socket, until, as described above for the first method variant, the axial securing ring comes to lie against the stop surface in the interior of the hub, and the sleeve-shaped region of the holding socket, offset radially inward, comes to lie above the widened outer groove of the hub. Now, in a final step, the tensioning band, which was already previously laid around the sleeve-shaped region of the holding socket that is offset radially inward, or is only laid there now, is tightened, thereby causing this region, if it does not already lie against the groove base of the widened outer groove of the hub, to lie against it, without the radial collar of the holding socket deforming. In this variant, the tensioning band merely prevents widening of the sleeve-shaped region of the holding socket and thereby loosening of the holding socket from the hub when axial forces occur between shaft and hub.

Disassembly of the connection takes place by means of loosening of the tensioning band in this embodiment, as well, as described above.

Further advantages and advantageous embodiments of the invention can be derived from the following description, the claims, and the drawings.

DRAWING

Preferred exemplary embodiments of the object according to the invention are shown in the drawing and will be explained in greater detail below. The figures show:

FIG. 1 the principle of the axial securing device, according to the invention, of a shaft/hub connection, FIG. 2 an enlarged detail of the axial securing device, FIG. 3 the holding socket pre-assembled on a hub, FIG. 4 the holding socket locked in place in the outer groove of the hub, by means of a tensioning band, FIG. 5 a divided holding socket, FIG. 6 the holding socket from FIG. 5 in the assembled position relative to a shaft and the inner ring of a joint, FIG. 7 a second embodiment of a holding socket, FIG. 8 the holding socket from FIG. 6 in the assembled position relative to a shaft and the inner ring of a joint, FIG. 9 a third embodiment of a holding socket, FIG. 10 the holding socket from FIG. 9 in the assembled position relative to a shaft and the inner ring of a joint, FIG. 11a a shaft pre-assembled with an undivided holding socket from FIG. 7, FIG. 11b the pre-assembled shaft from FIG. 11a introduced into a hub, and FIG. 11c the finished, assembled shaft/hub connection.

DESCRIPTION OF THE EXEMPLARY EMBODIMENT

Figure 1:
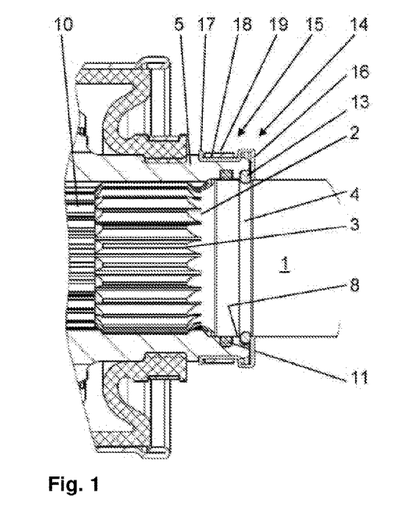
Figure 2:
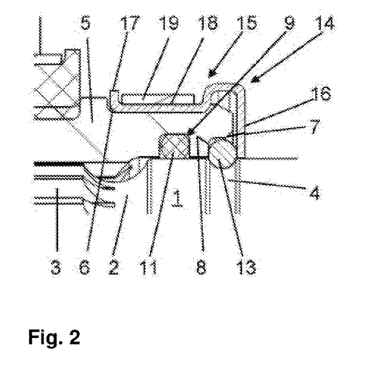
Figure 3:
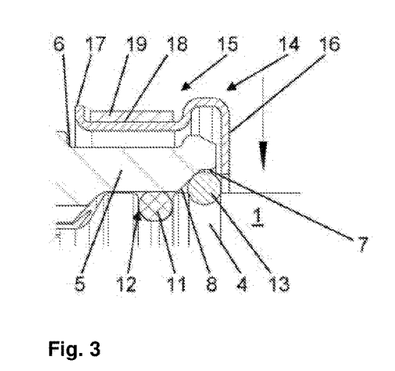
Figure 4:
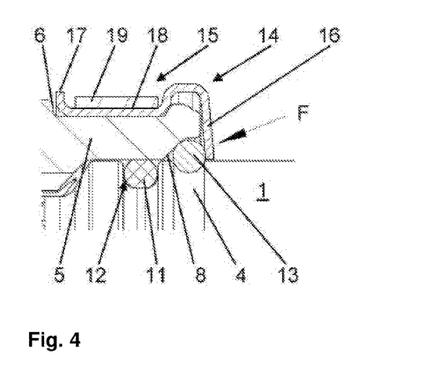

FIG. 1 shows the principle of a connection arrangement according to the invention for axially securing a shaft/hub connection, in the assembled state, and FIG. 2 shows an enlarged representation of a detail of this connection arrangement. It consists of a shaft 1, which has a shaft journal 2 having an outer splined cog 3 at its one end and is provided with a groove 4 at a short axial distance from this journal, and a hub 5, which is configured, in the present case, as an inner ring of a joint. On its outer circumference, the hub 5 has a widened outer groove 6, and on its face side, facing the shaft 1, it has a recess 7 having a greater diameter than its inside diameter, so that an axial stop surface 8 forms at a short axial distance behind its face surface. Axially following this recess 7, the inside diameter of the hub 5 corresponds to the outside diameter of the shaft 1, wherein both diameters form a fit with one another in this region, which fit allows the shaft 1 to be pushed into the hub 5. In this fit region, the hub 5 furthermore has an inner sealing groove 9. The part of the hub 5 that follows the fit region is provided with an inner splined cog 10 that is complementary to the outer splined cog 3 of the shaft journal 2. For a seal between shaft 1 and hub 5, a sealing ring 11 is laid into the inner sealing groove 9 of the hub 5. However, as can be seen in FIGS. 3 and 4, the seal can also be produced by means of positioning the sealing ring 11 in an outer sealing groove 12 of the shaft 1, which groove is deeper in comparison with the groove 4 mentioned above, so that the sealing ring 11 lies against the inner fit surface of the hub 5. In contrast to the hub 5 shown in FIGS. 1 and 2, in these two figures the stop surface 8 is structured conically. For the sake of a better overview, the details of the shaft/hub connection shown in FIGS. 2 to 4 are merely shown with their upper half.

The depth of the groove 4 of the shaft 1 is selected in such a manner that an axial securing ring 13 is partially accommodated by this groove 4. In the present example, the greater part of its radial thickness still projects out of the groove 4. The inside diameter of the recess 7 of the hub 5 is equal to or somewhat greater than the outside diameter of this axial securing ring 13 set onto the shaft 1. In the joined state, in other words when the outer and inner splined cogs 3, 10 of shaft 1 and hub 5 are in engagement with one another, the axial securing ring 13 lies against the stop surface 8 of the hub 5 with its ring surface that projects out of the groove 4 of the shaft 1, and projects, at least with part of its opposite side, at least all the way to the face surface of the hub 5, but even better, slightly beyond it. In this way, either the axial thickness of the axial securing ring 13 determines the axial position of the stop surface 8, i.e. the depth of the recess 7 of the hub 5, or the dimensions of the axial securing ring 13 must be selected according to the inside diameter and the depth of the recess 7, in such a manner that when the ring makes contact with the stop surface 8, it still projects beyond the face surface of the hub or ends precisely with it, at least with parts of its circumference.

In addition to the axial securing ring 13, the connection arrangement according to the invention is also secured with a holding socket 14, which has a sleeve-shaped part 15 in a coaxial expanse toward the hub 5, and a radial collar 16 on its face side facing the shaft 1, which collet, in the assembled state, projects beyond the ring surface of the face surface of the hub 5 that faces the shaft. The sleeve-shaped part 15 is guided coaxially relative to the outer surface of the hub 5, and is offset radially inward directly after projecting beyond the short diameter region of the hub 5 that is situated between face surface and widened outer groove 6, and projects beyond the widened outer groove 6 of the hub 5 with this region, which is reduced in diameter. In the present example, the free end of this sleeve-shaped part 15, which is reduced in diameter, is angled away radially outward toward a collar 17, so that this region that is reduced in diameter, provided with the reference number 18 in FIGS. 1 to 11, is configured in U shape in longitudinal-section, thereby causing the holding socket 14 to have greater radial rigidity. It is advantageous if the holding socket 14 consists of an elastic material, in order to be able to exert an axial counter-force on the axial securing ring 13 during assembly-related deformation, as will still be explained in greater detail below, in the description of the different assembly methods.

Furthermore, a tensioning band 19 can be seen in FIGS. 1 to 4, which band is structured as an Oetiker clamp in the present example and laid around the sleeve-shaped part 15 of the holding socket 14. Its width must therefore be smaller than or equal to the width of the region 18 of the sleeve-shaped part 15, which region is offset radially inward. In FIGS. 1, 2, and 4, the tensioning band 19 is shown in the tightened state, while in the state shown in FIG. 3, the tensioning band 19 is merely laid loosely around the holding socket 14, which has been pushed onto the hub 5.

A significant characteristic of the holding socket 14 is furthermore the radial width of its radial collar 16, which can also be seen in FIGS. 1 to 4. This width is selected in such a manner that the radial collar 16 at least lies axially against the axial securing ring 13 of the shaft 1 when the tensioning band 19 is tightened, but in a more advantageous case actually exerts an axial force F on the ring because of the elasticity of the holding socket 14, as can be seen in FIG. 4.

Figures 5, 6:
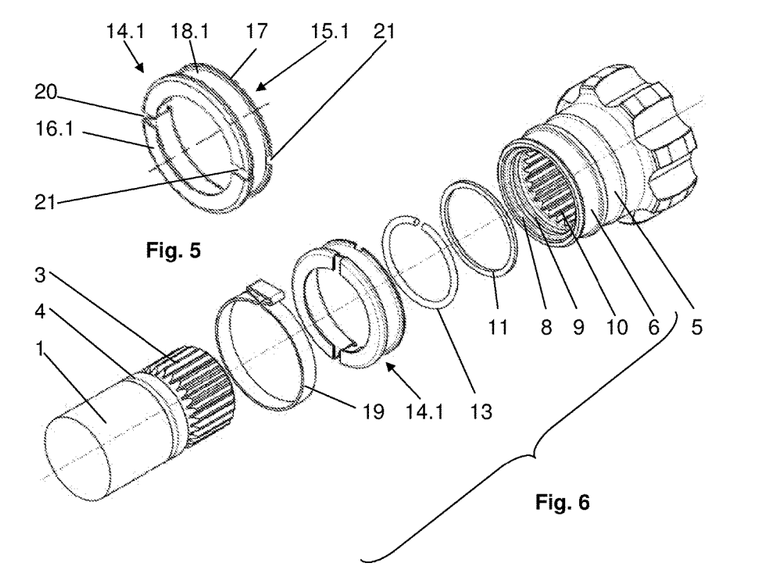
Figures 7, 8:
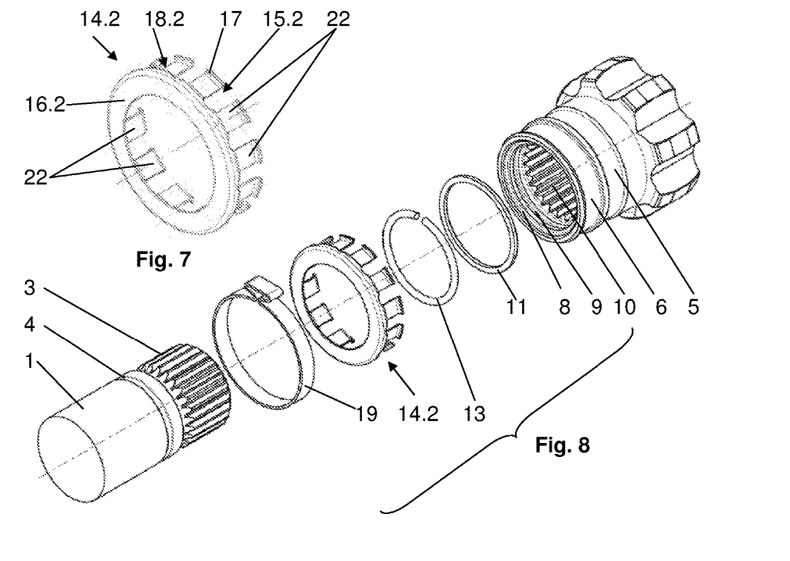
Figures 9, 10:
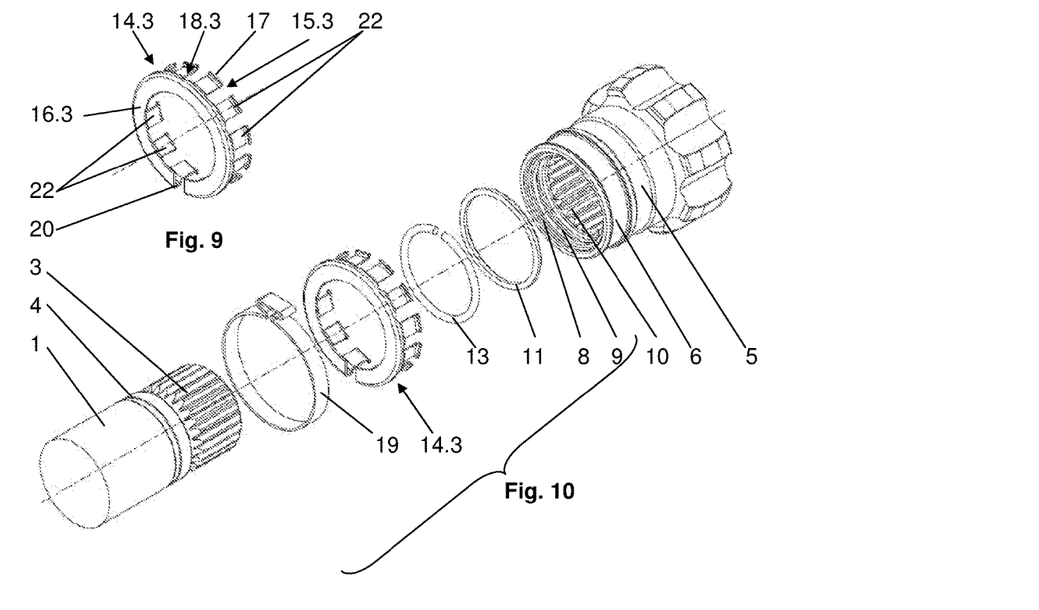

FIGS. 5, 7, and 9 show different embodiments of the holding socket 14, and FIGS. 6, 8, and 10 show a related assembly arrangement of the respective embodiment. A fundamental difference exists in the embodiments shown, in that the holding sockets 14 can be structured to be axially divided or undivided. To distinguish the different embodiments, the reference numbers previously used for the holding socket 14 and its components were designated with an additional numbering that is separated by a dot behind the previously used reference number, which numbering indicates the respective embodiment.

Holding sockets 14.1 and 14.3 that are structured to be axially divided are shown in FIGS. 5, 6, and 9, 10, while FIGS. 7 and 8 show a holding socket 14.2 that is structured to be undivided. The two free ends of the holding sockets 14.1 and 14.3 that resulted from the axial division are at a distance from one another, separated by a gap 20. A significant difference also consists in the assembly of the two embodiments of the holding socket 14. In a holding socket 14.1 and 14.3 that is structured to be divided, the two free ends move toward one another when the tensioning band 19 is tightened, so that the inside diameter of their radial collar 16.1; 16.3 is reduced. The movement direction performed by the radial collar 16.1; 16.3 in this regard is indicated in FIG. 3, by means of an arrow that points in the direction of the shaft 1. In contrast, the inside diameter of the radial collar 16.2 does not change, in the case of a holding socket 14.2 that is structured to be undivided, when the tensioning band 19 is tightened, but rather the radially offset region 18.2 of the sleeve-shaped part 15.2 of the holding socket 14.2 merely lies against the groove base of the widened outer groove 6 of the hub 5. This difference in the method of functioning of the holding sockets 14 will be discussed in greater detail below, in the description of the different assembly methods.

As has already been explained, FIG. 5 shows a divided holding socket 14.1 having a sleeve-shaped part 15.1 and a radial collar 16.1, which is also divided in its region that lies diametrically opposite the gap 20, so that an additional gap 21 is present here. Likewise, the collar 17.1 is divided by the additional gap 21 in the same circumference region. In this way, the holding socket 14.1 can be more easily compressed when the tensioning band 19 is tightened. FIG. 6 shows the assembly arrangement of shaft 1 and hub 5 when using the divided holding socket 14.1. In this embodiment, the sealing ring 11 is inserted into the inner sealing groove 9 of the hub 5. The shaft 1 merely has the groove 4 for accommodating the axial securing ring 13.

FIGS. 7 and 8 show an undivided holding socket 14.2, the sleeve-shaped part 15.2 of which consists of individual segments 22. Because its radial collar 16.2 does not deform when the tensioning band 19 is tightened, its inside diameter is designed to be smaller than the outside diameter of the axial securing ring 13 set into the groove 4 of the shaft 1. When the tensioning band 19 is tightened, the segments 22 are merely fixed in place on the groove base of the widened outer groove 6 of the hub 5. In this way, such an undivided holding socket 14.2 can be pushed onto the hub 5 only together with the axial securing ring 13 assembled on the shaft 1, wherein the segments 22 at first widen and, when the axial securing ring 13 makes contact with the stop surface 8, engage into the widened outer groove 6 of the hub 5. In this embodiment, too, the sealing ring 11 is inserted into the inner sealing groove 9 of the hub 5.

The holding socket 14.3 used in the embodiment of FIGS. 9 and 10 is once again structured to be divided. Its sleeve-shaped part 15.3 consists, as in the previous embodiment described, of individual segments 22. The sealing ring 11 is also inserted into the inner sealing groove 9 of the hub 5 in this embodiment. If the holding socket 14.3 in this embodiment consists of an elastic material, and if the region 18.3 of its sleeve-shaped part 15.3 that is radially offset inward is adapted to the dimensions of the widened outer groove 6 of the hub 5, i.e. the inside diameter of the offset region 18.3 is equal to or less than the outside diameter of the widened outer groove 6 of the groove 5 in the groove base, this holding socket 14.3 can easily be pushed onto the hub 5, wherein its segments spread apart and engage into the widened outer groove 6 when they cover it coaxially. Nevertheless, the holding socket 14.3 still has to be secured with the tensioning band 19 to prevent radial widening, which particularly occurs when axial forces act on the shaft 1 and/or hub 5.

However, the different embodiments of the holding socket 14 bring with them a different sequence of assembly of the shaft/hub connection, as will be explained in greater detail below, in the method descriptions.

Axially divided holding sockets 14.1; 14.3, as they are shown in FIGS. 5, 6, and 9, 10, can be radially deformed also in the region of their radial collar 16.1 or 16.3, respectively. For this reason they can be set onto the hub 5 and, after being connected with the shaft 1 that was completed with the axial securing ring 13, can be pressed into or secured in the widened outer groove 6 of the hub 5, by means of the tensioning band 19. This method of procedure is shown in FIGS. 3 and 4, wherein the parts relevant to the invention are identified only with their main reference number, for the sake of a better overview. In FIG. 3, the holding socket 14 is shown in its starting form, wherein its inside diameter in the region of its sleeve-shaped part 15 is greater than the outside diameter of the hub 5. The tensioning band 19 has already been laid around its radially offset region 18 but not yet tightened. The radial collar 16 merely projects the annular face surface of the hub 5 while its recess 7 is still free, so that the shaft 1 previously completed with the sealing ring 11 and the axial securing ring 13 can be pushed into the hub 5 without using a tool, until the axial securing ring 13 comes to lie against the stop surface 8 of the hub 5. Afterward, the tensioning band 19 is tightened, thereby causing the radially offset region 18 of the axially divided holding socket 14 to lie against the groove base of the widened outer groove 6 of the hub 5, and, at the same time, causing the radial collar 16 to narrow coaxially to the shaft 1, so that it engages behind the annular region of the axial securing ring 13 that projects out of the groove 4 of the shaft 1. In the embodiment of FIG. 4, it is clearly evident that the axial securing ring 13 projects slightly beyond the face surface of the hub 5, so that the radial collar 16 is deflected slightly from its original right-angle position relative to the axis of the shaft 1. If the holding socket 14 consists of an elastic material, its radial collar 16 exerts an axial force F on the axial securing ring 13 and presses the ring against the stop surface 8, so that the shaft/hub connection is axially free of play.

Assembly of the shaft/hub connection as described above is also possible with a divided holding socket 14.1 and 14.3, in which the inside diameter of the radially offset region 18.1; 18.3 is less than the outside diameter of the hub 5, but greater than the diameter of its widened outer groove 6. Such a holding socket 14.1 and 14.3 can still be easily pushed onto the hub 5, and furthermore has the advantage that after it is pushed on, it engages into the widened outer groove 6 of the hub 5 and can thereby be captively pre-assembled onto it. In the case that the radial collar 16.1; 16.3 partly covers the recess 8, an axial securing ring 13 that is mounted on the shaft 1 and is round in cross-section is able to slightly widen the holding socket 14.1 and 14.3 for a short time, without significant expenditure of force, when shaft 1 and hub 5 are brought together. During the subsequent tightening of the tensioning strap 19, the radially offset region 18.1; 18.3 then lies against the groove base of the widened outer groove 6 of the hub 5, as described above, so that in this regard, it engages behind the region of the axial securing ring 13 that projects out of the groove 4, with the effect described above, of exerting an axial force F on the ring.

Disassembly of the shaft/hub connection takes place by loosening the tensioning band 19, manually widening the divided holding socket 14.1; 14.3, and pulling shaft 1 and hub 5 apart from one another. Depending on the strength of the divided holding socket 14.1; 14.3, manual widening can also be eliminated, specifically if the radial forces that act on the divided holding socket 14.1; 14.3 widen it by themselves when shaft 1 and hub 5 are pulled apart, after the tensioning band 19 has been released.

Figure 11A:
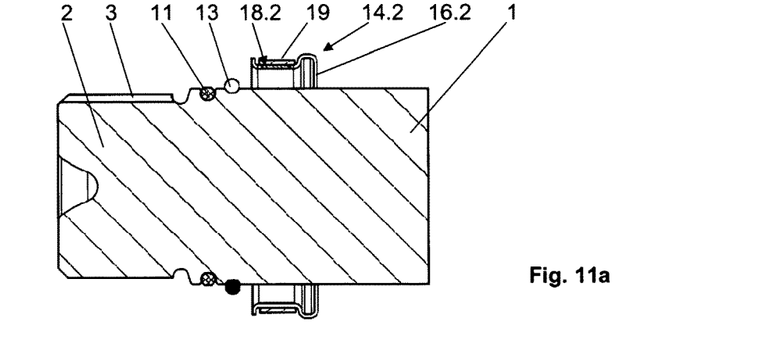
Figure 11B:
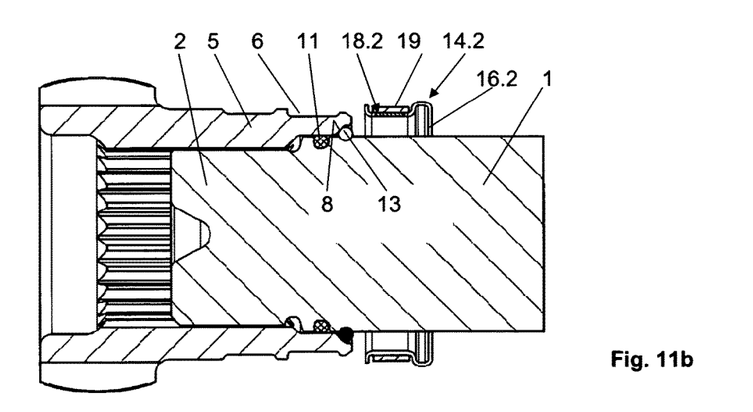
Figure 11C:
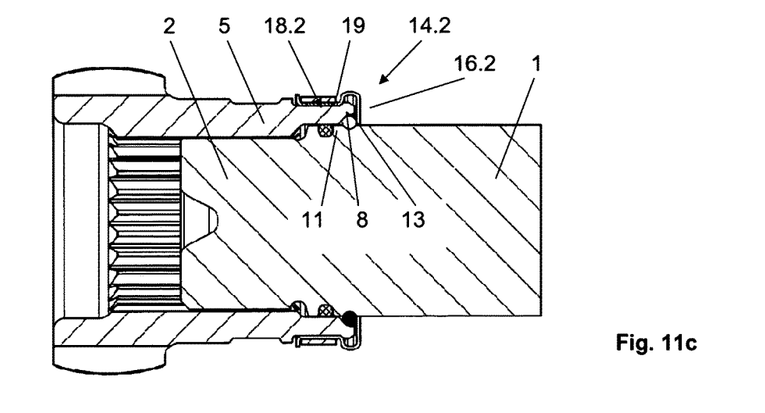

An axially undivided holding socket 14.2 is shown in FIGS. 7 and 8. Because it is not radially deformable or insufficiently deformable in the region of its radial collar 16.2 when the tensioning band 19 is tightened, the inside diameter of its radial collar 16.2 is designed, right from the start, so that it covers the annular region of the axial securing ring 13 that projects out of the groove 4 of the shaft 1, at least in part. For this reason, the holding socket 14.2 must be pre-assembled on the shaft 1, together with the axial securing ring 13. This pre-assembly is shown in FIG. 11a, wherein the tensioning band 19 is already laid around its radially offset region 18.2. FIG. 11b shows the intermediate step, in which the shaft 1 is pushed into the hub 5 until the axial securing ring 13 makes contact with the conical stop surface 8 of the hub 5. The holding socket 14.2, with the tensioning band 19 loosely laid around it, is still in front of the hub 5. FIG. 11c shows the completion of assembly of the shaft/hub connection, after the holding socket 14.2 has been pushed onto the hub 5 and pressed into the widened groove 6 of the hub 5 with its radially offset region 18.2, when the tensioning band 19 is tightened. Of course, the tensioning band 19 can also be laid around the holding socket 14.2 and tightened only during this last work step. In order to facilitate pushing on the holding socket 14.2, which has been pre-assembled on the shaft 1, while or after shaft 1 and hub 5 have been inserted into one another, and to facilitate pressing the radially offset region 18.2 into the widened groove 6 of the hub 5 while the tensioning band 19 is being tightened, its sleeve-shaped part 15.2 consists of individual segments 22, as has already been described above. The segments 22 spread apart slightly when being pushed onto the hub, and spring into the widened outer groove 6 of the hub 5 when they cover it, if the holding socket 14.2 consists of an elastic material. Finally, the tensioning band 19 is tightened, thereby securing the holding socket 14.2 to prevent it from widening.

In the case of a holding socket 14.2 that consists of a non-elastic material, the permanently spread segments 22 are pressed into the widened outer groove 6 of the hub 5 by tightening the tensioning band 19.

Disassembly of the shaft/hub connection having an undivided holding socket 14.2 takes place in the same manner as was described above for those having a divided holding socket 14.1; 14.3.

REFERENCE SYMBOL LIST 1 shaft
2 shaft journal
3 outer splined cog
4 groove
5 hub
6 widened outer groove
7 recess
8 stop surface
9 inner sealing groove
10 inner splined cog
11 sealing ring
12 outer sealing groove
13 axial securing ring
14 holding socket
15 sleeve-shaped part
16 radial collar
17 collar
18 radially offset region
19 tensioning band
20 gap
21 additional gap
22 segments
F axial force

The invention claimed is:
1. A connection arrangement for axially securing a shaft/hub connection, comprising:
an axial securing ring having an axial thickness,
a shaft having an outer splined cog and a groove for accommodating the axial securing ring,
a hub having an inner splined cog, an inner stop surface for the shaft, an outer groove, an annular face having an annular face surface, and a recess that proceeds from the annular face and has an axial depth,
a securing device comprising a radially deformable holding socket comprising an axially extending sleeve-shaped part and a radial collar, wherein the sleeve-shaped part surrounds the circumference of the hub, at least in part, and the radial collar engages behind the annular face surface of the hub, at least in part, and
a tensioning band,
wherein:
the outer groove of the hub is for axially positioning the securing device,
the inner stop surface for the shaft is formed in the hub via the recess, the axial depth of the recess and the axial thickness of the axial securing ring being such that in an assembled state the axial securing ring is in the recess, makes contact with the stop surface, and projects beyond the face surface of the hub or ends precisely with the face surface of the hub,
the axially extending sleeve-shaped part is offset radially inward from an outside diameter of the holding socket, at least in part, and surrounded by the tensioning band in this region,
the width of the outer groove of the hub corresponds at least to the length of the axially extending sleeve-shaped part of the holding socket,
the region of the holding socket that is radially offset inward coaxially surrounds the outer groove of the hub in the assembled state of the shaft/hub connection, when the shaft is provided with the axial securing ring and pushed into the hub, and can be locked in place in the outer groove of the hub via the tensioning band, and the radial collar of the holding socket lies against the axial securing ring of the shaft in the locked state.

2. The connection arrangement according to claim 1, wherein the holding socket is divided in the axial direction on its circumference.

3. The connection arrangement according to claim 2, wherein the ends of the holding socket that lie opposite one another at the division are at a distance from one another and form a gap between them.

4. The connection arrangement according to claim 3, wherein the radial collar that surrounds the face surface of the hub has an additional gap on its circumference region that lies opposite the gap.

5. The connection arrangement according to claim 1, wherein the inside diameter of the region of the holding socket that is radially offset inward and surrounded by the tensioning band approximately corresponds to the outside diameter of the hub.

6. The connection arrangement according to claim 1, wherein the inside diameter of the region of the holding socket that is radially offset inward and surrounded by the tensioning band is less than the outside diameter of the hub.

7. The connection arrangement according to claim 1, wherein the inside diameter of the region of the holding socket that is radially offset inward and surrounded by the tensioning band approximately corresponds to the widened outer groove of the hub.

8. The connection arrangement according to claim 1, wherein the radial collar of the holding socket comprises multiple elastic elements.

9. The connection arrangement according to claim 1, wherein the region of the holding socket that is radially offset inward comprises individual segments.

10. The connection arrangement according to claim 1, wherein the region of the holding socket that is radially offset inward is configured as a U profile in cross-section.

11. The connection arrangement according to claim 1, wherein the holding socket comprises an elastic material.

12. A method for axially securing a shaft/hub connection, comprising a shaft having an outer splined cog and a groove for accommodating an axial securing ring, as well as a hub having an inner splined cog, an inner stop surface for the shaft, and a groove for axially positioning a securing device that has an axially extending sleeve-shaped part and a radial collar, wherein shaft and hub are brought into engagement with their splined cogs to produce the connection, and secured in their axial position, relative to one another, by pushing the securing device onto the hub, which device engages into the outer groove of the hub during this process, wherein the sleeve-shaped part of the securing device surrounds the circumference of the hub, at least in part, and the radial collar engages behind the annular face surface of the hub, at least in part,
wherein
    a hub having an outer groove, the width of which corresponds at least to the length of the axially extending sleeve-shaped part of the securing device, and having an annular recess for accommodating the axial securing ring, is used,
    a holding socket divided in the axial direction, having a tensioning band that surrounds the axially extending sleeve-shaped part of the socket, is used as the securing device;
    first, the holding socket is pushed onto the said hub until it makes contact with the face surface of the hub with its radial collar, and the sleeve-shaped part comes to lie above the said widened outer groove of the hub,
    subsequently, the shaft, with the axial securing ring set into it, is inserted into the hub, or, vice versa, the hub is pushed onto the shaft until the axial securing ring is in the recess and makes contact with the stop surface of the recess of the hub, the axial securing ring projecting beyond the face surface of the hub or ending precisely with the face surface of the hub, and
    finally, the tensioning band is tightened, thereby pressing the sleeve-shaped part of the holding socket into the widened outer groove of the hub, and bringing the radial collar of the holding socket to lie against the axial securing ring of the shaft.

13. The method according to claim 12, wherein the outer grove of the hub has a widened portion in an assembled state of the shaft/hub connection,
    wherein the holding socket is radially deformable, and
    wherein the holding socket has a region that is radially offset inward coaxially and surrounds the widened portion of the outer groove of the hub in the assembled state of the shaft/hub connection.

14. A method for axially securing a shaft/hub connection, comprising a shaft having an outer splined cog and a groove for accommodating an axial securing ring, as well as a hub having an inner splined cog, an inner stop surface for the shaft, and a groove for axially positioning a securing device that has an axially extending sleeve-shaped part and a radial collar, wherein shaft and hub are brought into engagement with their splined cogs to produce the connection, and secured in their axial position, relative to one another, by pushing the securing device onto the hub, which device engages into the outer groove of the hub during this process, wherein the sleeve-shaped part of the securing device surrounds the circumference of the hub, at least in part, and the radial collar engages behind the annular face surface of the hub, at least in part,
wherein
    a hub having an outer groove, the width of which corresponds at least to the length of the axially extending sleeve-shaped part of the securing means, and having an annular recess for accommodating the axial securing ring, is used,
    a holding socket having an axially extending sleeve-shaped part and a radial collar, together with a tensioning band that surrounds the collar, is used as a securing means, wherein the inside diameter of the radial collar is less than the outside diameter of the axial securing ring,
    first, the shaft is pre-assembled with the holding socket and the axial securing ring, wherein the holding socket, seen in the direction of the hub, engages behind the axial securing ring, at least in part, which ring is inserted into the groove of the shaft,
    subsequently, the pre-assembled shaft is inserted into the hub, or, vice versa, the hub is pushed onto the pre-assembled shaft until the axial securing ring is in the recess and makes contact with the stop surface of the recess of the hub, the axial securing ring projecting beyond the face surface of the hub or ending precisely with the face surface of the hub, and the sleeve-shaped part of the holding socket comes to lie above the widened outer groove of the hub, and finally, the tensioning band is tightened, thereby pressing the sleeve-shaped part of the holding socket into the widened outer groove of the hub.

\* \* \* \* \*